United States Patent Office 3,708,513
Patented Jan. 2, 1973

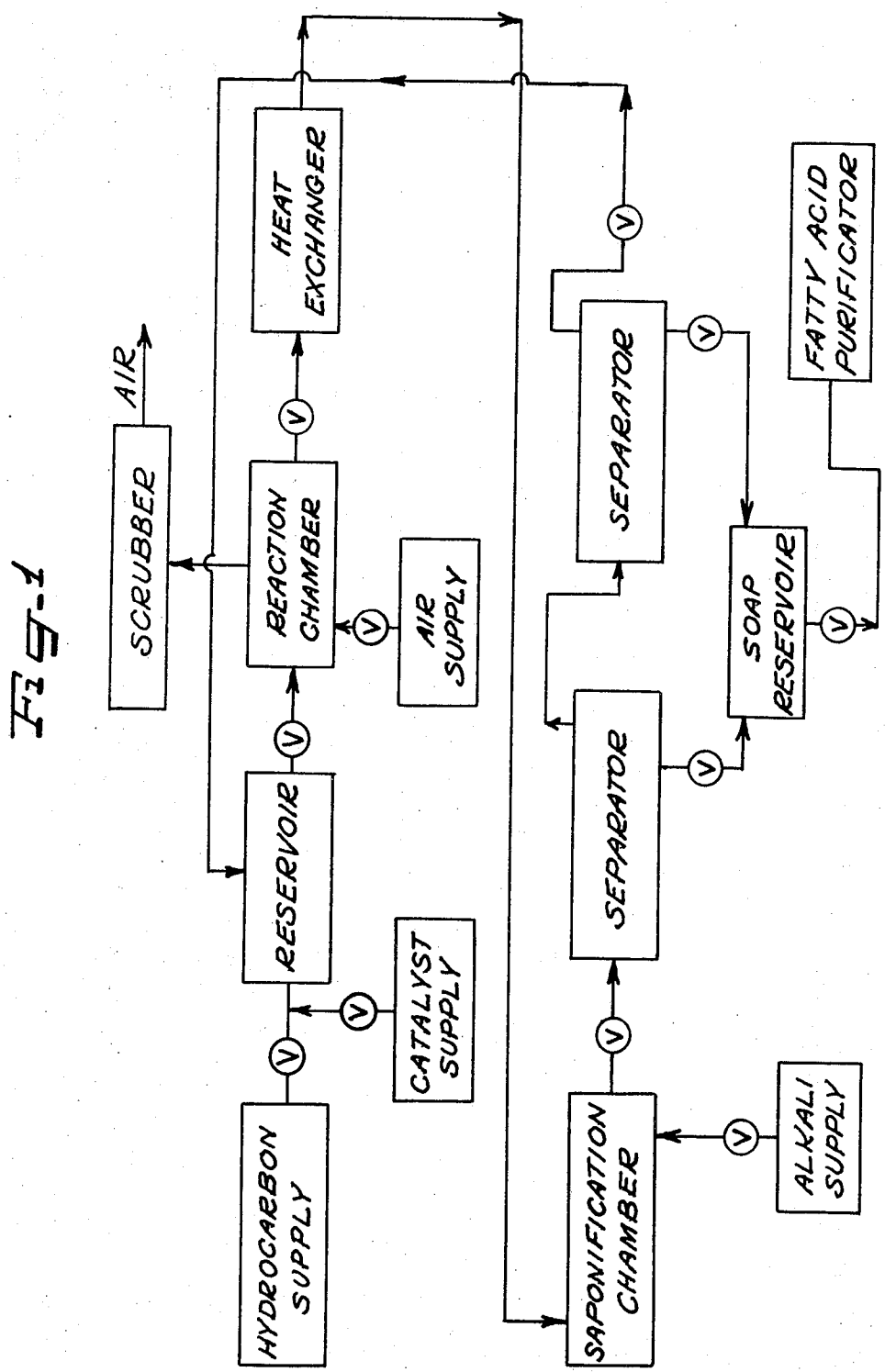

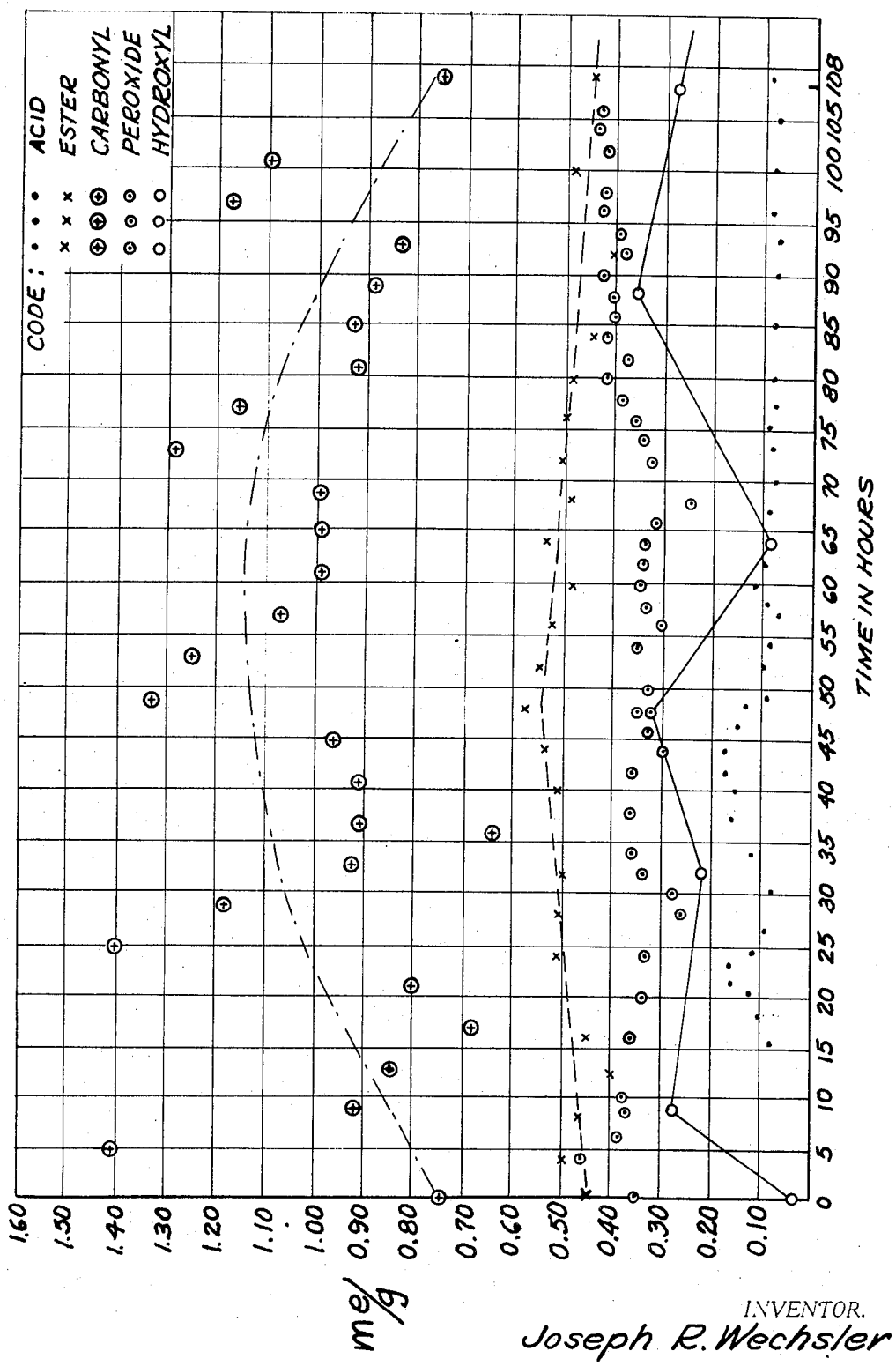

3,708,513
METHOD OF SYNTHESIZING FATTY ACIDS
Joseph R. Wechsler, Chicago, Ill., assignor to Stepan Chemical Company, Northfield, Ill.
Continuation-in-part of abandoned application Ser. No. 655,590, July 24, 1967. This application Nov. 13, 1970, Ser. No. 89,490
Int. Cl. C08h 17/36; C09f 5/10
U.S. Cl. 260—413
25 Claims

ABSTRACT OF THE DISCLOSURE

A process of manufacturing synthetic fatty acids from straight-chain hydrocarbons by catalytic oxidation wherein a reaction cycle is employed that reduces over-oxidation and molecular degradation so as to provide higher yields. The catalyst employed requires no mechanical removal from the reaction system. Relatively pure fatty acids are removed from the crude oxidation products by a plurality of alternative purification methods utilizing combined saponification and hydrogenation processes as well as extraction processes to reduce the contaminants in the ultimate product so as to yield substantially pure products.

CROSS-REFERENCE TO RELATED APPLICATION

This is a continuation-in-part application of my co-pending U.S. Ser. No. 655,590 filed July 24, 1967 now abandoned.

BACKGROUND OF THE INVENTION

Field of the invention

The present invention relates to a process of manufacturing synthetic fatty acids. Most specifically, the invention relates to a process of oxidizing straight-chain hydrocarbons wherein the majority of the product will be of a carboxylic nature and to a process of purifying the relatively crude carboxylic oxidation products recovered from such a process to obtain relatively pure synthetic fatty acids.

Description of the prior art

Oxidation of aliphatic hydrocarbons to form organic carboxylic substances is generally one of the oldest organic reactions known. This process has not been changed significantly since it was first discovered. In principle, this process reacts petroleum wax or some other aliphatic hydrocarbon with an oxygen source at high temperatures, in the presence of a catalyst. Generally, the catalyst utilized is a compound of a polyvalent metal, such as manganese and/or cobalt and the oxygen source is generally air. The present day process, set forth above, suffers from a number of serious drawbacks. The fatty acid materials formed by the known reaction processes are subjected to over-oxidation, which is conductive to the formation of not only poly-functional compounds but also to substantial molecular degradation, which inhibits the formation of high molecular weight fatty acids. In addition, the catalysts used in the known processes create a number of problems in the efficient removal and recovery thereof. Moreover, these catalysts tend to form undesirable by-products, such as heavy metal soaps and/or various cationic complexes which in turn are extremely difficult to remove from the desired end products. Further, the nature of the air input in the known processes is such that a considerable amount of excessive volatile materials are entrained therein and thereby substantially reduce the ultimate yield. While various attempts to capture these volatile products are made, they all require the utilization and insulation of highly efficient and costly scrubbing equipment.

Generally, the formed carboxylic compounds in such an oxidation process are conventionally removed by treatment with an alkali. This removal process is generally performed as a high temperature saponification of the oxidate product so that the obtained water solution contains not only carboxylic soaps, but also a large number of unreacted or partially reacted hydrocarbons, i.e. paraffins, as well as other various impurities, making subsequent purification very difficult and/or uneconomical.

In accordance with the heretofore known procedure, the crude carboxylic oxidation products obtained by saponification of an oxidate of various paraffin materials contain a substantial amount of impurities, generally ranging from about 20% to about 40%, depending primarily on the method employed for its manufacture. These impurities consist of unreacted hydrocarbons, alcohols, carbonylic compounds, lactones, various polyfunctional compounds and other less identifiable compounds. Various means for removal of these impurities are known. The most common method is based on solvent extraction of the crude soap solution. This method is disadvantageous in that it necessitates the recovery of the solvent for economical utilization thereof. Moreover, the solvents used are always at least partially soluble in the soap solution so that they have to be removed from the product as well as from the extract. Of course, this complicates not only the recovery of the solvent but also the purification of the product. Further, this method is only a partial solution to the purification problem because of the effectiveness of removing impurities by extraction is a function of distribution between the solvents. Accordingly, an infinite number of extractions are required for a complete removal of the impurities. In addition, the use of solvents introduces an element of fire hazard to the overall process. Another known method for removal of impurities is high pressure steam distillation. While this particular method appears to dispense with some of the fire hazards involved and the need for recovery of a solvent, it introduces additional problems. For example, it is necessary to install extremely costly equipment that is capable of withstanding the high pressures and temperatures that are required under the highly corrosive conditions found in such a steam distillation process. Further, this alternative method is, again, only a partial solution in as much as the effectiveness of steam distillation is a function of partial vapor pressures of the impurities so that some of the impurities are always left behind, especially those having higher boiling points. In addition, the various unsaponifiable materials obtained from such a process are contaminated by various side reactions during this process, as evidenced by the much darker colors and a tendency to produce a higher proportion of polyfunctional fatty acids when such unsaponifiable materials are re-oxidized. Another severe drawback from this method of purifying the crude product is that a substantial amount of decarboxylation takes place, which of course, materially lowers the yield as well as the average molecular weight of the desired product. Further, the drastic conditions presently employed, i.e. temperatures well in excess of 300° C. and pressures in the order of 200 atmospheres do not permanently remove all of the ester groups present so that a pure product is still obtained.

SUMMARY OF THE INVENTION

In general, the invention provides a process for manufacturing straight-chained mono-basic fatty acids from essentially linear hydrocarbons of an average molecular weight corresponding to one having 2 to 6 more carbon atoms than the desired range of fatty acids and consists of substantially uniformly dispersing an organic catalyst with the hydrocarbons so as to obtain a mixture and heating the mixture to a temperature of not more than 160° C. and simultaneously contacting the mixture with an oxygen containing gas to effect an oxidation of the hydrocarbon so as to not exceed about 3% fatty acids by weight content of the reaction mixture. Thereafter, an alkali solution is added and intermixed with the reaction mixture to effect a saponification thereof. The saponified mixture is collected and a phase separation effected wherein an organic phase is removed and recycled for additional oxidation, while the aqueous phase (i.e. the lower phase) is purified to obtain the desired range of straight-chained mono-basic fatty acids. The purification processes include hydrogenation of the recovered crude products, with the removal of the volatile impurities therein so as to obtain a concentrated soap solution and thereafter acidifying such concentrated soap solution with a mineral acid and distilling the resultant product to obtain relatively pure fatty acids. Alternatively, the relatively concentrated soap solution can be mixed with various solvents, i.e. acetone, and the resultant system acidified with sulfuric acid so as to precipitate sodium sulfate therefrom and then a further amount of sulfuric acid is added to effect a phase separation and then the top layer is decanted from such system, and which consists essentially of pure fatty acids. Similarly, a bicarbonate purification process can be utilized.

Accordingly, one of the objects of the present invention is to provide a method of manufacturing synthetic fatty acids from straight chain hydrocarbons, which method provides a substantial reduction of over-oxidation and molecular degradation.

Another object of the invention is to provide a method of manufacturing fatty acids which avoids the use of particulated catalysts thereby rendering the costly and time consuming removal of such catalyst unnecessary. A further object of the invention consists of providing a method of recovery of carboxylic compounds which greatly reduces the contamination of the soap solutions and thereby facilitates purification of the desired fatty acids.

Yet a further object of the present invention is to provide a method of synthesizing fatty acids from paraffin materials which is a continuous reaction cycle thereby reducing the cost of the final product.

Yet a further object of the present invention is to provide a method of removing impurities from crude synthetic fatty acids obtained in the oxidation of paraffin materials whereby relatively economical equipment is employed and the chemical tools used in the removal of the impurities are easily recoverable and the method is reasonably free of fire hazards.

Yet a further object of the invention is to provide a method of purification of crude fatty acid solutions obtained from the oxidation of paraffin materials whereby substantially pure fatty acids are obtained.

A further object of the invention is to provide a purification method for crude synthetic fatty acids wherein substantially mild conditions are utilized, with substantially inexpensive and easily maintained equipment and wherein the recovered unsaponified compounds are ready for reprocessing without the danger of excessive accumulation of impurities.

Still a further object of the invention is to provide a method of purification of crude fatty acids obtained from oxidation of paraffin materials whereby the molecular structure of the final products is protected and not affected by the purification process.

Other objects, advantages and features of the invention will become more apparent from the teachings of the principles of the present invention and in connection with the disclosure of the preferred embodiments thereof in the specification, drawings and claims.

BRIEF DESCRIPTION OF THE DRAWINGS

FIG. 1 is a schematic flow diagram illustrating a means effective to practice the novel concepts of the invention; and FIG. 2 is a graphic illustration depicting the relative steadiness of the chemical condition during the operation of the process of the invention.

DESCRIPTION OF THE PREFERRED EMBODIMENTS

During the course of the instant description, reference will be made to an "oxidation" reaction, and it is to be understood that the scope of this term is intended to imply to generically designate oxidation reactions utilizing oxygen-containing gases to introduce at least one and preferably a plurality of oxygen atoms to an organic hydrocarbon material, such as a paraffin. Accordingly, reference to an "oxidation" reaction in the instant disclosure will be understood to apply to any and all reactions which result in the substitution of oxygen radicals into the molecule of the initial starting material.

The starting material or charging stock preferably consists of saturated aliphatic straight-chain hydrocarbons containing at least about six carbon atoms and up to thirty or forty carbon atoms. Preferably the starting materials are paraffin hydrocarbons containing 14 to 20 carbon atoms. The preferred oxygen-containing gas is air, however, other oxygen-containing gases may also be utilized. In accordance with the principles of the invention, and as will be noted from FIG. 1, an oxidizable hydrocarbon starting material is pumped into a reaction chamber wherein it is intimately intermixed with a catayst. The catalyst may be mixed with the organic compound during pumping or within the chamber or elsewhere as desired. Preferably, an organic peroxide catalyst is utilized since such catalyst can be intermixed with the reaction system and allowed to remain therein without the necessity of filtering it or otherwise mechanically removing it from the mixture. Preferably, the organic peroxide utilized in the practice of the instant invention is selected whereby its half-life at the temperature of the reaction is approximately equal to the induction period of the oxidation reaction. Thus, tertiary-butyl hydroperoxide is somewhat slower acting, while certain other alkylol peroxides, such as lauroyl peroxide, are relatively fast. Preferably, organic peroxides having a half-life of about 5 to 100 minutes at temperatures in the range of 120° C. to 180° C. are preferred. Such peroxides include benzoyl peroxide, ditertiary-butyl peroxide, mixtures thereof and other peroxides having similar properties. The half-life of a catalyst may be defined as the period in which the activity of the catalytic substance decreases to approximately one half of its initial value. Generally, the ratio of the catalyst material to the oxidizable hydrocarbon starting materials, i.e. the paraffin materials, is in the range of about 1:500 to 1:20,000 and preferably in the range of 1:1,000 to 1:2,000.

In accordance with the present invention, raw materials and the catalyst are placed in a reactor of a convenient size and heated to a temperature of not more than about 160° C. and preferably in the range of 120° C. to 160° C. whereupon oxygen-containing gas, such as air, is pumped through the raw materials at a preset rate. After an intial induction period ranging from several minutes to about two hours, depending primarily upon the catalyst employed and the hydrocarbon used as raw material, the reaction between the oxygen and the paraffin materials initiates and maintains itself. If so desired, a manganese soap soluble in paraffin materials under reaction conditions may be utilized to further reduce the induction time of the reaction. However, the use of this soap might require a filtration step and is thus optional. After reaction is self-sustaining, the reaction mixture is withdrawn from the reactor at a preset rate, as determined by the level of fatty acids therein, and directed through a heat exchanger to a saponification chamber wherein it is treated under efficient agitation with an aqueous alkaline solution. The intimate mixture of the oxidation reaction mixture and the alkaline solution is then transferred at a constant rate into a separator, wherein stratification or phase separation occurs. The bottom layer consists of a soap solution, while the top layer consists of unreacted or partially reacted raw materials which can then be transferred into a second separator or a liquid-liquid centrifuge to remove the last traces of the soap solution. The remainder of the partially reacted or unreacted portion of oxidation materials is then recycled back to the reaction chamber and again passed through the reaction cycle just described. A certain amount of fresh raw materials is continuously fed into the reactor along with the recovered partial reacted materials so that the fresh materials compensate for the removed materials from the system in the soap solution. The bottom layer of the separator is withdrawn at a relatively constant rate and the soap thus obtained is transformed and purified into the desired range of fatty acids. The rate of withdrawal of the reaction mixture from the reactor is so regulated that no more than about 3% of free fatty acids by weight of the total reactants within the reaction chamber have accumulated. This control of withdrawal rate inhibits over-oxidation and thus inhibits formation of multifunctional chemical compounds which make purification difficult. FIG. 2 graphically illustrates the course of a typical $C_{14}$–$C_{18}$ paraffin oxidation reaction. As will be seen from the graph legend, the fatty acid level is maintained at an average of about 0.1 milliequivalent per gram of acid content and never exceeds about 0.2 milliequivalent per gram. However, it will be appreciated that when the desired fatty acids are of a lower molecular weight, i.e., $C_5$–$C_9$, then in order to maintain the 3% fatty acid level in the withdrawn reaction mixture, the milliequivalent per gram must be increased accordingly.

In accordance with the present invention, the acidic portion of the crude oxidation reaction product may be purified in a number of alternative methods.

A method of purifying such crude soap solutions obtained from the separator include mixing such soap solutions with a predetermined amount of a hydrogen catalyst, purging the air from around such a mixture and simultaneously introducing pressurized hydrogen gas (i.e. at 350 to 650 p.s.i.) and heat to obtain a temperature in the range of about 190° C. to 300° C. for a period of time sufficient so that the pressure within the hydrogenation vessel is in the range of about 500 to 2,000 p.s.i. After this brief digestion period, i.e. 10 to 60 minutes, the pressure is slowly released and the volatiles are allowed to escape. This distillation is continued until a relatively concentrated, i.e. at least 50%, soap solution is attained. The hydrogenation catalyst is then removed, as by filtration, and the filtrate is then suitably acidified to obtain the desired range of fatty acids. If desired, the filtrate may also be converted to relatively pure alkyl esters of such fatty acids.

Another method of purifying the fatty acids obtained from the filtrate includes selective extraction of impurities therefrom with a solution of sulfuric acid having a concentration less than 94%, i.e. one capable of forming a two-layer system and/or a mixture of sulfuric acid with a polar solvent which is substantially non-reactive with fatty acid carboxylic groups. The extraction process allows the impurities to remain within one phase of the two-phase system and substantially pure fatty acids are retained in the other phase.

Additional methods of purifying the crude soap solution obtained from the separators include mixing such product with a polar solvent, such as acetone, dioxane, methyl butyl ketone, mixture thereof, etc. and then adding sulfuric acid so that sodium sulfate is formed and precipitates from the mixture. Thereafter, additional acid is added so that a phase separation is effected and pure fatty acids are recovered as described above. Similarly, a bicarbonate based purification process may be utilized.

If desired, the acidic portion of the crude products may be purified by reacting them with a polyol or polyamine so as to form a product therewith having a much higher boiling point than the remainder of the material in the crude product so that the impurities and the like therein can be removed from the mixture by high temperature vacuum distillation. The polyol or polyamine is subsequently recovered in a relatively simple manner and is ready for reuse as desired without any additional purification or manipulation, and the fatty acid is recovered as such or as ester thereof in a pure state. Additional aspects of this concept are disclosed and claimed in my copending U.S. Ser. No. 89,491.

As indicated previously, the preferred raw materials are straight-chain normal paraffin compounds, particularly those having from 10 to 24 carbon atoms. Expressed in another way, particularly since the paraffin materials are generally not obtainable in any one particular pure state but generally consist of a mixture of various molecular weight compounds, the starting paraffin materials should have a molecular distribution such that the molecular average value substantially corresponds to the molecular weight of the desired range of fatty acids plus 2 to 6 additional carbon atoms, i.e. the oxidation process of the instant invention generally removes 2 to 6 carbon atoms in forming the desired fatty acids.

When the paraffinic materials are intimately dispersed with air at elevated temperatures there is an induction period before the reaction actually begins, which varies with the particular conditions employed. The preferred catalysts of the invention reduce the normal induction period of 5 to 15 hours to an induction period of somewhat less than 2 hours, depending upon the particular catalyst employed. Once the induction period has occurred the oxidation reaction becomes self-sustained, and the crude reaction mixture products can be steadily and continuously removed from the reaction chamber at a preset rate of withdrawal, as described earlier. The steady and continuous removal of the reaction mixture, which includes carboxylic compounds formed during the oxidation reaction, from the reaction zone or chamber inhibits reoxidation of such compounds since this would result in di- and other poly-functional compounds which are undesirable in that their presence renders purification extremely difficult. Further, such steady and continuous removal of the various carboxylic compounds formed produces as additional beneficial effect in as much as the average molecular weight of the products obtained therefrom is significantly higher than the products obtained from a discontinuous or batch-type process. It is therefore apparent that the steady and continuous removal of the carboxylic compounds from the reaction zone significantly reduces molecular degradation. This is especially surprising since workers in the art have generally suggested that oxygen attack on a paraffin molecule is directed so that the end-product would be of a molecular size essentially half of the starting material.

A further beneficial effect which is immediately measurable, is that the amount of esters formed in the oxidation product during any given time interval is substantially smaller than the amount of free acids formed during the same interval. This is quite surprising since in a batch-type process the amount of esters formed is usually found to be equal or greater than the amount of free acids formed. This can be seen in FIG. 2 where the ratio between esters and fatty acids is practically constant throughout the reaction, although the acids are being continuously removed from the reaction mixture while the esters remain within the mixture.

A general characteristic of this type of oxidation is the formation of water of reaction. Generally, this water of reaction is collected in an appropriate scrubber system.

The water layer generally contains an appreciable amount of volatile and water soluble products, such as formic, acetic, and propionic acids, as well as appreciable amounts of peracids and hydrogen peroxides, which latter compounds are especially useful in epoxidation applications.

In order to achieve a process allowing the continuous removal of reaction products and recycling of raw materials (i.e. the unreacted and partially reacted materials) so as to allow such process to run for an indefinite length of time, operational conditions have to be carefully adjusted so that the chemical composition of the materials in the reaction zone will be essentially the same at any time during the process. This is achieved by proper adjustment of several variables, which include: temperature of the reaction; residence time; concentration and rate of flow of alkaline solution; and temperature of the alkali treatment.

The temperature of the reaction is carefully selected and controlled. The rate of reaction increases with temperature but so does reoxidation and molecular degradation. However, if the temperature is too low the reaction will slow down and finally stop. The preferred temperature of reaction of the present invention is in the range of 120° C. to 160° C. whereby a balance between the speed of reaction and avoidance of reoxidation and degradation is achieved.

The residence time of the various chemical constituents in the reaction zone is, of course, somewhat dependent upon the temperature of reaction since the temperature regulates the reaction rate. Generally, the shorter the residence time, the less undesired side reactions and the cleaner the product will be. However, too short a residence time does not yield sufficient product, even though such product might be exceptionally pure. It is therefore preferred to have a residence time in the range of about 20 to 100 minutes.

The concentration of the alkaline solution must be carefully selected in order to obtain the best results. If an alkaline solution is utilized which is too dilute, the soap solution tends to form emulsions which take a long time for stratification or phase separation and thereby upset the timing of the cycle. On the other hand, if the alkaline solution utilized is too concentrated, then the soap solution will separate out faster but will have unfavorable solubility properties. Generally, it is preferred to utilize an alkali, such as sodium hydroxide, with a concentration range of about 2% to 15% by weight in water to obtain the best results. The rate of flow of the alkaline solution into the reaction mixture is adjusted in such a manner that there is preferably a slight excess of alkali over the total carboxylic content in the oxidation product at all times. In other words, the pH of the overall mixture is maintained substantially in the range of 8.0 to 12. If this pH is not maintained, extraction of the fatty acids becomes erratic, apparently due to the tendency of soap to form complexes with free fatty acids at a more acidic pH. As will be appreciated, any available alkali may be utilized, although sodium hydroxide is preferred from a solubility and economic consideration.

The temperature of the alkali-oxidation product mixture is also carefully controlled. If this temperature is allowed to become excessively high, excess material will be extracted during each cycle and will contaminate the product. This will also tend to slow down the reaction and eventually stop it, since essential reaction intermediates, chiefly peroxides are removed or destroyed, and cannot be regenerated fast enough to maintain the required rate of reaction. On the other hand, if the saponification temperatures are allowed to become too low, there is a tendency to form emulsions which separate too slowly to allow a continuous operation. Preferably, temperature is regulated so as to be in the range of about 30° C. to 60° C. and thereby provide effective and selective removal of the desired range of fatty acids as well as a reasonably fast phase separation without a significant reduction in peroxide content of the reaction intermediates.

The rate of oxygen-containing gas pumped through the reactor influences the reaction to a limited extent over a wide range of rates. Essentially, the rate of oxygen-containing gas, such as air, must be high enough to insure an excess of oxygen over and above the amount of oxygen required to form the expected amount of oxidation product per unit time. Generally, a sufficient excess is obtained by the use of a flow rate of air corresponding to about 250 to 1,000 ml. air per kg. hydrocarbon per minute, or about 4 to 16 times the theoretical oxygen requirement of the paraffin material to oxidize it to the desired fatty acids. Accordingly, the ratio of the oxygen-containing gas to the paraffin materials is generally in the range of about 2:1 to 20:1. By keeping the flow of air on the lower side of the above range, excessive losses of volatile reactants are avoided and overall yields are substantially increased without affecting the chemistry of the reaction to an appreciable extent. Moreover, by keeping the air flow at a minimum within the aforesaid range, the rate of ester formation is substantially depressed both in a continuous-type reaction and also in a batch-type reaction. One explanation for this occurrence is that at higher rates of air flow, water of esterification is more quickly removed thereby allowing esterification to proceed at a faster rate and under the present conditions, where a minimum air flow is utilized, the water of esterification tends to accumulate and thereby retard esterification. Preferably, the air or other oxygen-containing gas is intimately dispersed through the reaction mixture by means of any convenient mechanical means, such as increased agitation of the overall mixture and/or utilization of a fine spray contacting the oxygen with the hydrocarbon materials. Generally, a sparge system wherein the air enters into a reactor through fast moving agitator blades having openings therein yields satisfactory results. Further, as the reaction proceeds and the oxidation products are formed, the degree of dispersion of air also increases, thus making it unnecessary to use any surfactant-based surface tension depressers or other dispersion agents to effect the intimate dispersion between oxygen and the hydrocarbons.

The reaction is essentially exothermic and the reaction zone must be provided with an efficient heat exchanger in order to maintain a relatively constant reaction temperature. The heat exchanger is of such size and capacity as to be capable of maintaining the conditions in accordance with the volume of the reaction mixture.

The phase separation of the saponified oxidation products do not allow for ideal efficiency, and trace amounts of soap, water and free alkali are occasionally entrained by the recycle materials into the reaction zone. Generally, such small amounts of entrained contaminants do not influence the reaction to any appreciable extent except for the formation of minor solid particles which may tend to collect in spots throughout the reaction apparatus and threaten to clod the flow of the reaction mixture. However, convenient means, such as traps or the like, may be placed in the conduit leading from the separator system to the reaction chamber to remove such solid particles.

A preferred means of utilizing a continuous process operation with a minimum of supervision includes the use of automatic leveling devices to control the flow of fluid automatically as a function of the preset levels and interfaces whereby once the equilibrium conditions have been obtained, such devices continue to maintain the equilibrium conditions. By way of illustrating the preferred oxidation process of the present invention, Examples 1 through 6 are set forth hereinafter so that the principles of the invention may be better understood.

As indicated earlier, the crude oxidation product obtained from the oxidation reaction of paraffin materials described hereinabove may be purified by a number of improved and novel methods. One particular method of purifying such crude synthetic fatty acids obtained by the oxidation of hydrocarbons involves the combination of hydrogenation and saponification processes into a single highly efficient process. In accordance with this method a crude soap solution of about 10% to 40% and preferably 25% strength is fed into an appropriate pressure vessel capable of handling corrosive materials at elevated pressure and temperature conditions. A crude soap solution of a given concentration or strength is mixed with a predetermined amount of a hydrogenation catalyst and air is purged from the pressure vessel. Hydrogen gas is introduced into the system under pressure in the range of about 350 to 650 p.s.i. while heat is simultaneously added so that the mixture attains a temperature in the range of 190° C. to 300° C. and these pressure and temperature conditions are maintained for a digestive period of time while the pressure within the system increases up to about 2,000 p.i.s. After a digestion period of about 10 to 60 minutes the pressure is gradually released through an opening at the top of the vessel allow steam and other volatiles to escape into a suitable condenser system. The steam entrains various gross impurities which can be condensed to form an oil layer that is easily recoverable from the condensate by decantation. The oil layer is of a light color, consists primarily of unreactant paraffins, alcohols, ketones and other less identifiable chemicals. It is significant that practically no esters can be found in this oil.

The steam distillation is continued until the crude soap solution reaches a relatively concentrated stage, i.e., at least 50% strength, as indicated by the amount of the condensate. The soap solution is then discharged and the catalyst is removed, as by filtration. The filtrate is then further processed to obtain the desired range of pure fatty acids, or if desired, methyl esters thereof.

The above described hydrogenation process can be carried out in such a way that the charging of the crude soap solution and the steam distillation therefrom proceeds in a substantially continuous manner. For instance, the crude soap solution coming from a continuous oxidation process is pumped into a pressure vessel where it is mixed with a catalyst and hydrogen, then it is pressurized and heated to a higher temperature, while steam and concentrated soap are expelled at a controlled rate. All of these various flows being adjusted in such a manner that a preset residence time is achieved and a steady level of liquids is maintained throughout the system.

The relatively concentrated soap solution can be treated in a number of different ways to liberate the desired range of fatty acids. When the concentrated soap solution is directly acidified, the steam distillation is preferably stopped at a point corresponding to about a 40% to 60% or more soap concentration (depending upon the viscosity of the solution). After distillation has been stopped and the catalyst removed, the relatively concentrated soap solution is mixed with an equivalent amount of strong acid, such as sulfuric so that a two-phase system forms. To express this in another way, sufficient mineral acid is added to the concentrated soap solution to achieve a pH of not more than about 3.5 within the solution. The free fatty acids separate from the soap solution and are removed by decantation. The recovered free fatty acids (i.e. mixture of fatty acids) are of a relatively light color and have a means or average molecular weight essentially the same as the molecular weight of the starting materials, indicating a very low degree of decarboxylation. Upon fractionation, a product of about 95% purity is obtained. The majority of the impurities are generally found in the highest fractions while the first two fractions, generally corresponding to $C_4$–$C_{10}$ fatty acids, are practically free of impurities. The residue from the final fraction can then be re-saponified together with the following batches of crude soap solutions so that the losses incurred by distillations are substantially reduced.

In certain instances, the acidification of crude soap solutions in aqueous medium has certain disadvantages. It appears that certain lactonic linkages tend to regenerate, as evidenced by the ester content of the fatty acids, and additional re-esterification tends to occur during the distillation, with an increased amount of residue. Moreover, sodium sulfate salt formed during acidification is left in the water layer and is generally lost. In order to avoid these disadvantages, another method of the invention comprises continuing the steam distillation of the crude soap solution until a relatively higher concentration thereof, i.e. about 50% to 80% (depending upon the viscosity of the resultant concentrated solution) soap concentration is reached. This continued steam distillation is preferably carried out during the hydrogenation, however, the hydrogenation step can be postponed until after the steam distillation has taken place. The relatively highly concentrated soap solution is then allowed to cool to substantially below 70° C. and dissolved in approximately 1 to 3 volume equivalents of a polar solvent. Preferably, such polar solvent is selected from the group consisting of acetone, dioxane, methyl butyl ketone and mixtures thereof, although other polar solvents such as diformyl can also be utilized if desired. The soap solution-polar solvent mixture is then acidified with a stoichiometric amount of sulfuric acid and preferably maintained at a temperature in the range of 10° C. to 50° C. A copious precipitation of a hydrate of sodium sulfate occurs, and this salt is filtered off quite easily, washed with a suitable solvent, such as methanol, and recovered in a relatively pure state. The remaining solution is then provided with an additional amount of sulfuric acid whereupon a clear-cut phase separation occurs. The top layer thereof consisting of almost pure fatty acids and the bottom layer containing substantially all of the mineral acid, practically all of polar solvent and small amounts of impure fatty acids as well as other impurities. By repeated extractions the amount of impurities in the fatty acids can be drastically reduced.

Generally, the ratio of sulfuric acid to polar solvent ranges from about 1:10 to about 10:1.

The invention provides a method of obtaining a desired range of relatively pure fatty acids from a concentrated soap solution by either directly acidifying such solutions to obtain a phase separation therein and extracting the desired fatty acids by decantation, or by intermixing the relatively concentrated soap solution with a suitable polar solvent, generally acetone, although other volatile polar solvents that do not react with the carboxylate group of fatty acids can also be utilized, and then providing a sufficient amount of sulfuric acid to precipitate a sodium sulfate salt which can be recovered as desired. The remaining solution, i.e. the mother liquor is then provided with additional amount of sulfuric acid so that a two-phase system occurred which again lends itself to recovery of substantially pure fatty acids by decantation. Of course, if desired, repeated extractions can be utilized to further increase the purity of the product, particularly by a countercurrent flow process.

In instances where especially pure, i.e. colorless fatty acids are desired, a further bleaching step can be effected by subjecting the fatty acids recovered to a relatively mild hydrogenation process in the presence of a suitable catalyst, such as nickel on carbon or nickel on kieselgur. Alternatively, the crude fatty acid reaction product obtained from the oxidation process of the invention can be purified by the removal of lactones from such product by extraction with a buffered water phase, whereby the lactones are left in the organic phase. Lactones are one of the impurities likely to be formed in the crude fatty acid oxidation product obtained from the practice of the invention. These generally consist of hydroxy acids or internal esters thereof and they are extremely difficult to remove because they generally undergo all of the reactions that a monofunctional fatty acid undergoes, except that upon acidification of the hydroxy-soaps an internal ester linkage is likely to be formed between the hydroxy groups and the freed carboxyl groups. As a result of this property of the hydroxy acids of the type formed during the synthesis described, the obtained fatty acids will frequently have a saponification value exceeding their acid value. Such lactones can be effectively removed by treating the crude fatty acid solutions with an aqueous bicarbonate solution such as an aqueous solution having an equivalent amount of $NaHCO_3$, whereby the free fatty acids will form soaps and selectively go into the water phase, while the lactones will stay in the organic phase. If so desired, the lactones can then be removed by extraction with an appropriate organic solvent such as petroleum ether or chloroform. Upon acidification of the remaining soap solution with a mineral acid a two-phase system will form liberating fatty acids. The liberated fatty acids now contains a substantially lower ester content, as evidenced by a considerably smaller difference between their acid values and the corresponding saponification values.

As will be appreciated, the principles of the invention may also be applied to a discontinuous or batch process to obtain similarly improved results.

The fatty acids obtained from the process of the invention are relatively pure, i.e. ranging from about 80% to about 99% pure and the starting materials may be so selected as to give any desired range of fatty acids. Of course, if desired, these fatty acids may be separated into individual fatty acids for various applications.

A number of examples will now be set forth to further illustrate, but not limit, the principles of the instant invention.

EXAMPLE I

The apparatus utilized for this example is shown schematically at FIG. 1. 6,335 grams of raw materials consisting essentially of a mixture of normal tetradecane, pentadecane and hexadecane, was charged into the system by placing 2400 grams into the reactor, with the rest of the raw materials being divided between the extractor, the two separators and the reservoir vessel. In order to eliminate any induction period, the initial charge of raw materials was pre-oxidized in a batch-type reaction to an acid content of 0.15 me./g. and the free acid removed by extraction with an alkaline solution. One gram of di-tertiary butyl perioxide was placed in the reactor and the material heated to 140° C. Air was sparged through the reactor at a rate of about 8 liters per minute (corresponding to 3.31/kg. oil/min.) and the reaction set in almost at once, as evidenced by formation of water of reaction which was collected in a water trap. When about 4 ml. of water was collected, the raw materials were allowed to circulate in the system and the continuous cycle started at a rate adjusted to one hour residence time, which corresponds to a maximum fatty acid formation of about 3% by weight of total reactants in the reactor. The adjustment was by means of adjustable Teflon stop cocks controlling all gravity flows and with conventional pumps. A NaOH solution was charged into the alkali supply vessel at a 2.5% strength and its rate of flow was adjusted to provide enough alkali to neutralize the free acids in the reactants at the saponification chamber.

This cycle was maintained around the clock for 84 hours and at the end of this time period the reaction was stopped. During the reaction time, fresh material (but no additional catalyst, nor any preoxidized material) was constantly fed to the system at a rate which would compensate for the material removed from the system by the alkaline solution and by periodic sampling for analysis. The total charge of raw materials during the cycle was 14,820 grams. At the end of the run, 8,044 grams of oil were accounted for, thus:

6,390 grams in the apparatus
962 grams removed for sampling
692 grams recovered from the scrubber system Accordingly, the consumed material amounted to 6,776 grams. The soap solution collected in the soap reservoir was acidified with $H_2SO_4$ to a pH below 3.5, and the obtained layer of crude reaction products, i.e. unpurified fatty acids, weighted 5694 grams or about a 84% yield. As will be appreciated, the acidification was performed at this time merely to ascertain the results of the oxidation process and under natural operating conditions it is more practical to continue directly with one of the purification steps discussed earlier. Of this crude product, 5,100 grams was re-saponified and the gross impurities removed by repeated extractions with petroleum ether, whereupon the soap solution was acidified and 3,380 grams of fatty acids and 1,465 grams of oil were recovered. This oil was suitable for use as a recycle material into the oxidation process. The fatty acids thus obtained had an average molecular weight of 186, generally corresponding to undecanoic acid, and had a molecular distribution as follows:

$C_6$–$C_7$ fatty acids=6.5%
$C_8$–$C_{10}$ fatty acids=26.8%
$C_{11}$–$C_{14}$ fatty acids=54.9%
$C_{15}$–$C_{16}$ fatty acids=11.8% as determined by gas chromatography.

The water of reaction collected in the trap weighed 2,287 grams and contained about 4% $H_2O_2$ and about 9% water soluble fatty acids and peracids.

EXAMPLE II 9,100 grams of a starting material consisting essentially of a mixture of normal tetradecane (29.4%, pentadecane (42.9%), and hexadecane (23.6%), was charged into the apparatus described at FIG. 1 by placing 2,400 grams into the reactor and dividing the rest between the two separators, the saponification vessel, and the reservoir vessel. In order to avoid an induction period, this material was preoxidized to an acid content of 0.15 me./g., and the free acid removed by extraction with an alkaline solution. One gram of ditertiary butyl peroxide was placed in the reactor and the material heated to 140° C. Air was sparged through the reactor at a rate of 2.5 liters per minute, or 1 liter air/kg. oil/minute, and the reaction set in almost at once, as evidenced by water of reaction starting to collect in a trap. When about 4 ml. of water was collected, the continuous cycle was started at a rate of one hour residence time in the reactor (i.e. corresponding to approximately a 3% fatty acid formation). A NaOH solution was charged into the alkali supply vessel at a 9.3% strength and its rate of flow into the saponification vessel was adjusted to provide an amount of alkali corresponding to about 10% excess over the amount required to neutralize the total carboxylic content in the reactants at the saponification chamber. In order to help break up emulsions, the temperature in the saponification vessel was maintained at about 40°–45° C. No other electrolyte was used in the NaOH solution, and the rate of separation of emulsion was satisfactory.

This cycle was maintained around the clock for 108 hours, at the end of which time period it was stopped. The general equilibrium conditions of the reaction system are graphically illustrated in FIG. 2. During this time fresh material was continually fed to the system at a rate adjusted to compensate for the material removed from the system during operation. In order to simulate ultimate batch-type conditions, the fresh material was identical with the one used for the initial charge. No additional catalyst was used. These fresh materials brought the total charge of raw material to 22,640 grams.

At the end of the run, 11,015 grams of oil was accounted for thus:

9,910 grams in the apparatus
800 grams removed for samples
923 grams recovered in the scrubber system
102 grams lost by spillage.

Accordingly, the consumed material amounted to 11,625 grams. The soap solution was collected in the soap reservoir vessel and acidified with $H_2SO_4$ to a pH 3 (again to merely ascertain the results of the oxidation process) and the crude reaction mixture so obtained weighed 11,480 grams, or a yield of 98.8%.

500 grams of this crude reaction mixture was dissolved in a solution of 100 grams NaOH in 1500 cc. $H_2O$ to recreate pre-acidification conditions. The so-obtained salt solution was then charged into an autoclave of 4 liter capacity and heated to about 250° C. under pressure. Gross impurities were removed by steam distillation and the concentrated soap solution was cooled and acidified. In this manner 75 grams of recycle oil was collected and 351 grams of synthetic fatty acids were recovered. The recyle oil had a carbonyl content of about 0.68 me./g. and an OH content of 2.54 me./g.

The synthetic fatty acids removed were analyzed to have a number average molecular weight of 172, generally corresponding to the decanoic acid, and a molecular distribution as follows:

$C_4$–$C_7$ fatty acids=13.2%
$C_8$–$C_{10}$ fatty acids=36.4%
$C_{11}$–$C_{14}$ fatty acids=41.0%
$C_{15}$–$C_{16}$ fatty acids=9.4% as determined by gas chromatography.

As indicated previously, the analytical data of this example is graphically illustrated at FIG. 2, showing the steadiness of the chemical composition in the circulating reaction mixture over a relatively long period of time. It will be noted that the amount of free fatty acid never exceeds about 3% by weight (i.e. is always less than about 0.20 me./g.) clearly indicating that the process provides a low oxidation level. Such low oxidation levels are important in the avoidance of excessive formation of undesirable impurities in that a relatively low level of impurities are much more readily removed.

This example shows the advantageous yields obtained by improved conditions. It also shows that excessive re-use of pre-oxidized material, as would be the case with discontinuous or batch operations, is conducive to the formation of lower molecular weight fatty acids.

EXAMPLE III

A reaction was carried out in accordance with the procedure described in Example II, with the only difference being that no pre-oxidized material was utilized. After an induction period of 1.5 hours the reaction started and the cycle was continued for 34 hours. The crude reaction mixture obtained had a number average molecular weight of 189.

EXAMPLE IV 23 kg. of a mixture of $C_{14}$–$C_{15}$ and $C_{16}$ normal paraffins described in Examples I and II was charged into a stainless steel reactor of 40 liter capacity equipped with an agitator, a temperature control jacket, a sparger and a distilling assembly. 10 g. of benzoyl peroxide was introduced into this material and the mixture was heated to 275° F. and air was pumped through the mixture at a rate of about 25 liters per minute. After an induction period of 1.5 hours, the reaction set in, as evidenced by the formation of water of reaction and the emission of heat of reaction. The reaction was allowed to proceed at 270° F.–275° F. for 24 hours. The acid content was ascertained at this time as being 0.98 me./g. and the reaction stopped. At this stage of the reaction, 23.8 kg. of raw material was accounted for thus:

22.83 kg. in the apparatus
0.97 kg. removed for samples and a total of 1.45 kg. water of reaction was collected, containing 420 g. soluble acids.

22.8 kg. of the oxidate (i.e. the reaction mixture) was intimately mixed with 1.6 kg. NaOH in 16 liters of $H_2O$ for thirty minutes and allowed to separate so that the formed upper layer contained the water insoluble oils, while the lower layer contained water-soluble acids, soaps, minerals and other water-soluble impurities. In this way, 22.96 kg. of soap solution and 17.36 kg. of re-cycle oil was obtained. The soap solution was acidified with concentrated $H_2SO_4$ to a pH 3 to form a two-layer system. The upper layer containing fatty acid was removed by decantation and washed with water to remove traces of the mineral acid. This crude product weighed 4.96 kg. By taking into account the amount of oil removed from the reaction zone for samples, the oil consumption amounted to 4.64 kg. indicating a yield of about 107%. This crude reaction product had a mean molecular weight of 175, clearly indicating the principal difference between batch and continuous reactions.

500 g. of this crude acid was re-saponified and the obtained soap solution extracted four times with petroleum ether to remove gross impurities. The combined extracts were stripped of solvent and the remaining oil weighed 50 g. and upon being analyzed showed a content of 0.94 me./g. carbonyl and 0.83 me./g. OH. The remaining soap solution was acidified and 380 g. of fatty acids were obtained which upon analyzation showed a content of 0.47 me./g. esters and a mean molecular weight of 173.

500 g. of the same crude reaction product was submitted to a high pressure steam distillation at about 300° C. for removal of gross impurities. The oil collected in the condensate weighed 75 g. and contained 1.25 me./g. carbonyl and 1.82 me./g. OH. Upon acidification, the soap solution yielded 374 g. fatty acids which contained 0.03 me./g. esters and had a mean molecular weight of 167.5, indicating a certain degree of decarboxylation.

EXAMPLE V 17.3 kg. of the recycle oil obtained during the saponification of the oxidate as described in Example IV was charged into a 40 liter stainless steel reactor provided with an agitator, a heater, a sparger and a distillation assembly. The material was mixed with 5.7 kg. of a mixture of $C_{14}$, $C_{15}$ and $C_{16}$ normal paraffins and 10 g. of di-tertiary-butyl-peroxide and then heated to 275° F. Air was pumped through the raw material at a rate of 25 liters per minute and the reaction started within 20–30 minutes. Samples were withdrawn periodically for analysis. After 10.5 hours, the acid content reached 0.85 me./g. and the reaction was stopped. At this stage, 23,577 kg. of material was accounted for thus:

22,877 kg. in the reactor
687 kg. removed for samples
0.013 kg. recovered from the scrubber system.

representing about 102% of the charge. In addition to this, 1.256 kg. water of reaction (5.45% of the charge) was collected which contained 386 g. water-soluble fatty acids. 22.8 kg. of the oxidate was then intimately mixed with 1.29 kg. NaOH in 15 kg. of water and then allowed to separate. In this matter, 20.916 kg. of soap solution and 18.113 kg. of recycle oil was obtained, showing an oil pick-up in the soap solution of 4.626 kg. and a loss of 61 g.

1.58 kg. concentrated $H_2SO_4$ was slowly introduced to this soap solution and after the phase separation, 4.27 kg. of crude fatty acid was obtained. By taking into account the amount of oil removed for samples, the corrected computations show an oil consumption of 4.2 kg. and a yield of about 101.5%. This crude reaction mixture was determined to have a mean molecular weight of 169 by gas chromatography.

EXAMPLE VI

A mixture of 1.700 g. of $C_{14}$ and $C_{15}$ normal paraffins and 700 g. of paraffin wax having a softening point of 49°–52° C. was charged into a 4 liter glass reactor provided with Teflon stirrer, sparger, automatic heating control and scrubbing assembly. One gram of benzonyl peroxide was added and the reactants were heated to 140° C. and air was sparged through the mixture. After two hours, the reaction was vigorous and the temperature was cut back to 125° C. and kept at that level for the duration of this example. After 37 hours of reaction, the free fatty acid content reached 1.55 me./g. and the reaction was stopped. The oxidate was saponified by the method described in Examples IV and V, and the soap solution submitted to a high pressure steam distillation at 330° C. for removal of gross impurities. The oil layer condensing with the steam amounted to about 9.7% of the oxidate and contained 0.54 me./g. carbonyl and 3.0 me./g. OH. Upon acidification, the soap solution delivered a crude synthetic acid material amounting to 29.2% by weight of oxidate, which had a mean molecular weight of 199.7, a free acid content of 94.7%, and a molecular distribution as follows:

$C_5$–$C_7$ fatty acids=4.7%
$C_8$–$C_{10}$ fatty acids=20.2%
$C_{11}$–$C_{14}$ fatty acids=64.3%
$C_{15}$–$C_{18}$ fatty acids=7.7%
$C_{19}$–$C_{24}$ fatty acids=3.1%

EXAMPLE VII 2,100 g. of a soap solution was obtained to recreate pre-acidification conditions as described in Example II and was charged into an autoclave together with 10 g. of a 50% nickel on kieselgur catalyst. The vessel was purged of air and the system was pressurized with hydrogen at 500 p.s.i. and heated to 295° C. whereby the pressure rose to about 1,700 p.s.i. After a one hour digestion period, steam was allowed to escape through the condenser until 1,000 ml. water and 95 g. oil were collected. The oil was practically colorless. After cooling to room temperature, the concentrated (i.e. about 50%) soap solution was filtered to remove the catalyst and then acidified with 110 g. $H_2SO_4$ so that a two-layer system formed. The decanted upper layer containing fatty acids was washed with water to remove traces of the mineral acid. The fatty acids so obtained weighed 325 g. and had a mean molecular weight of 165, as determined by gas chromatography. A methyl ester obtained from product (fatty acids are conventionally so converted for purposes of analysis) had 10.6% impurities, as determined by gas chromatography.

EXAMPLE VIII

This example was carried out in accordance with the procedure described in Example VII, except that the temperature of the reaction was maintained at 250° C., the ensuing pressure rose to only 950 p.s.i., and no digestion time was allowed. The oil obtained by steam distillation weight 74 g. and was practically colorless. The product obtained weighed 374 g. and had a mean molecular weight of 176.7 and a gas chromatography analysis of its methyl ester showed 6.8% impurities.

EXAMPLE IX 800 g. of a crude fatty acid products obtained from oxidation of paraffinic material as described in Example II, having a carboxylic content of 4.75 me./g. was mixed with 176 g. NaOH and 1,000 cc. $H_2O$ until dissolution occurred. The soap solution was charged into an autoclave and heated to 200° C., while the pressure was allowed to rise up to 1750 p.s.i. After a two hour digestion period, steam was allowed to slowly escape until 860 cc. of water was condensed, thereby collecting 48 g. of a rather dark oil material. The contents of the pressure vessel were allowed to cool to a temperature of 90° C. and then discharge under a slight pressure. The product was a highly concentrated viscous soap solution weighing 1041 g. (i.e. about 80% soap concentration) 150 g. of this soap solution was dissolved in 200 ml. $H_2O$ and acidified with 32 g. conc. $H_2SO_4$ to form a two-layer system. The separated oil was washed with water and dried. 112 g. of synthetic fatty acids were obtained which upon esterification with methanol showed a mean molecular weight of 182.5 and 11.3% lactone impurities, as determined by gas chromatography.

EXAMPLE X 890 g. of a $C_8$–$C_{10}$ fraction of synthetic fatty acids obtained by fractionation of the product obtained by a process as described in Example VII (which had a color of 1–2 in the Gardner scale) was placed in a stainless steel pressure reactor together with 18 g. of a 50% nickel on kieselguhr catalyst. The air within the pressure vessel was purged with hydrogen at 500 p.s.i. and the temperature was raised to 150° C. The reaction vessel was closed and these conditions were maintained for a period of time. When no more hydrogen was absorbed, the reactants were cooled to room temperature, the catalyst was filtered off and the product washed twice with 10% $H_2SO_4$ in $H_2O$ to remove traces of dissolved nickel. The final product was colorless and had a good color stability over an extended period of time.

As will be appreciated, the entire reaction product from Example II can be treated as described and similar results will be obtained.

EXAMPLE XI 50 g. of the synthetic fatty acids obtained by the process described in Example IX, containing 11.3% lactones was dissolved in a solution of 18.8 g. $NaHCO_3$ in 150 g. $H_2O$ by introducing the fatty acids slowly into the bicarbonate solution under gentle stirring so that excessive frothing was avoided. When the evolution of $CO_2$ ceased, the soap solution was extracted twice with 100 ml. portions of a water insoluble organic solvent, i.e. petroleum ether. After each extraction, the reactants were allowed to separate into two layers, and which separation took a considerable period of time. The combined extracts were evaporated to dryness under partial vacuum conditions leaving a residue of 3.2 g. oil. The soap solution was acidified with an equivalent amount of conc. sulfuric acid and the organic layer thus obtained was evaporated to dryness to remove the petroleum ether which had remained in solution with the soap layer. 43 g. of fatty acids were thus obtained containing 6.3% lactones, while the residue from fatty acids were thus obtained containing 6.3% lactones, while the residue from the petroleum ether extractions contained 94.5% lactones.

EXAMPLE XII 1007 g. of the synthetic fatty acids obtained by a process as described in Example VIII, containing 7.5% lactones, was dissolved in a mixture of 1,100 g. methanol and 100 g. water. The obtained solution was slowly introduced into a solution containing 523 g. $NaHCO_3$ in 3,300 g. of $H_2O$ while allowing the $CO_2$ escape under gentle agitation at about 50° C. The obtained soap solution was extracted seven times with diminishing portions of $CHCl_3$ ranging from 250 cc. down to 100 cc. Unlike the extraction described in the previous example, this time the separation into layers took place rapidly and effectively. Upon evaporation to dryness of the combined extracts a residue of 114 g. was obtained. The remaining soap solution was treated with 306 g. $H_2SO_4$ and the organic layer separating out as a result of the acid treatment was stripped of the solvent under partial vacuum conditions, leaving a residue of 890 g. of fatty acids which analyze to contain only 2% lactones.

Various other modifications and changes, other than those already discussed, can, of course, be effective without departing from the spirit and scope of the novel concepts of the instant invention.

I claim as my invention:

1. A process for the manufacture of straight-chain monobasic fatty acids from essentially linear hydrocarbons of an average molecular weight corresponding to hydrocarbons having 2 to 6 more carbon atoms than a desired range of fatty acids; consisting of (A) substantially uniformly dispersing an organic peroxide catalyst having a half-life of 5 to 100 minutes at a temperature range of 120° to 180° C. with said linear hydrocarbons to obtain a mixture thereof, (B) heating said mixture to a temperature of not more than 160° C., (C) substantially simultaneously contacting said mixture with an oxygen containing gas to effect an oxidation thereof not exceeding about 3% of free fatty acids by weight content of reactants, (D) adding and intermixing an alkaline solution with said reactants to effect saponification of said reactants and form a saponified mixture thereof, (E) collecting said saponified mixture to effect a phase separation thereof, (F) removing an upper phase and recycling said phase to step (B), and (G) removing non-fatty acid matter from a lower phase of said saponified mixture to obtain straight-chain monobasic fatty acids, whereby the contents of undesired polyfunctional by-products in said reactants are reduced by preventing the formed free fatty acids from accumulating beyond about 3% by weight of said reactants so as to avoid further oxidation of said fatty acids.

2. A process as defined in claim 1 wherein steps (A) through (G) define a continuous process.

3. A process as defined in claim 1 wherein the ratio of organic peroxide to the linear hydrocarbons is in the range of 1:500 to 1:20,000.

4. The process a defined in claim 1 wherein the residence time of the linear hydrocarbons from step (B) through (D) is in the range of 20 to 100 minutes.

5. A process as defined in claim 1 wherein the alkaline solution in step (D) contains an alkali base material in the range of 2 to 15% by weight, in aqueous solution.

6. A process as defined in claim 1 wherein the alkaline solution of step (D) is added in an amount sufficient to maintain the pH of the overall mixture in the range of 8.0 to 12.

7. A process as defined in claim 6 wherein the alkali in the alkaline solution is NaOH.

8. A process as defined in claim 1 wherein step (D) includes controlling the temperature to maintain the same in the range of about 30° C. to 60° C.

9. A process as defined in claim 1 wherein the step (G) consists of (a) adding a hydrogenation catalyst to the saponified mixture to form a reaction mixture, (b) purging air from around said reaction mixture, (c) adding pressurized hydrogen gas to said reaction mixture, (d) substantially simultaneously maintaining a temperature in the range of 190° C. to 300° C. and a pressure in the range of 500 to 2,000 p.s.i. surrounding said reaction mixture for a period of time ranging from 10 to 60 minutes, (e) gradually releasing the pressure and allowing volatiles to escape until a relatively concentrated soap solution is obtained, (f) removing the hydrogenation catalyst from the concentrated soap solution, (g) acidifying the relatively concentrated soap solution with an equivalent amount of a mineral acid, and (h) distilling the resultant product to obtain relatively pure fatty acids.

10. A process as defined in claim 9, wherein any residue remaining after step (h) is re-cycled to step (G) (a).

11. A method of producing relatively pure fatty acids from crude soap solutions of fatty acid products obtained from oxidation of essentially linear hydrocarbons of an average molecular weight corresponding to hydrocarbons having 2 to 6 more carbon atoms than a desired range of fatty acids, consisting essentially of feeding a crude soap solution of about 10% to 40% strength into a pressure vessel, mixing the crude soap solution with a hydrogenation catalyst, purging air from said vessel, adding hydrogen gas to said vessel at a pressure in the range of 350 to 650 p.s.i. and substantially simultaneously raising the temperature within the pressure vessel to 190° to 300° C., maintaining the pressure and temperature conditions within the pressure vessel for a period of time ranging from 10 to 60 minutes, slowly releasing the pressure and allowing steam to escape until a relatively concentrated soap solution is obtained, cooling the relatively concentrated soap solution and removing the hydrogenation catalyst therefrom, acidifying the relatively concentrated soap solution with an equivalent amount of a mineral acid to produce an organic layer and a water layer, and distilling the resultant organic layer to obtain relatively pure fatty acids.

12. A method of producing relatively pure fatty acids from crude soap solutions of fatty acid products obtained from oxidation of essentially linear hydrocarbons of an average molecular weight corresponding to hydrocarbons having 2 to 6 more carbon atoms than a desired range of fatty acids, consisting essentially of feeding a crude soap solution of about 10% to 40% strength into a pressure vessel, mixing the crude soap solution with a hydrogenation catalyst, purging air from said vessel, adding hydrogen gas to said vessel at a pressure in the range of 350 to 650 p.s.i. and substantially simultaneously raising the temperature within the pressure vessel to 190° to 300° C., maintaining the pressure and temperature conditions within said pressure vessel for a period of time ranging from 10 to 60 minutes. Slowly releasing the pressure and allowing steam to escape until a soap solution of about 50% to 80% is obtained, cooling the relatively concentrated soap solution and removing the hydrogenation catalyst therefrom, acidifying the relatively concentrated soap solution with a mineral acid until a pH of not more than 3.5 is attained so that a two-layer system is produced, removing the fatty acid layer from said system by decanting said system, and distilling the free fatty acid layer to obtain relatively pure fatty acids.

13. A method of producing relatively pure fatty acids from crude soap solutions of fatty acid products obtained from oxidation of essentially linear hydrocarbons of an average molecular weight corresponding to hydrocarbons having 2 to 6 more carbon atoms than a desired range of fatty acids, consisting essentially of feeding a crude soap solution of about 10% to 40% strength into a pressure vessel, mixing the crude soap solution with a hydrogenation catalyst, purging air from said vessel, adding hydrogen gas to said vessel at a pressure in the range of 350 to 650 p.s.i. and substantially simultaneously raising the temperature within the pressure vessel to 190° C. to 300° C., maintaining said pressure and temperature conditions within said pressure vessel for a period of time ranging from 10 to 60 minutes, slowly releasing the pressure and allowing steam to escape until a relatively concentrated soap solution is obtained, cooling the relatively concentrated soap solution and removing the hydrogenation catalyst therefrom, acidifying the relatively concentrated soap solution with an equivalent amount of a mineral acid to produce an organic layer and a water layer, separating said organic layer from said water layer, mixing said organic layer with a solution of sulfuric acid of a concentration less than 94% to form a two-layer system, and separating the two formed layers of the system whereby the upper layer has a greater percentage of the desired range of fatty acids than the lower layer.

14. A method as defined in claim 13 wherein the mixing of the organic layer with the solution of sulfuric acid to form a two-layer system and separating the two formed layers of the system is repeated a plurality of times.

15. A method as defined in claim 14 wherein the repetition of mixing and separating is carried out by a countercurrent flow process.

16. The method as claimed in claim 13 wherein the solution of sulfuric acid includes a polar solvent which is substantially non-reactive with fatty acid carboxylic groups, the ratio of sulfuric acid to polar solvent ranging from 1:10 to 10:1.

17. A method as defined in claim 16 wherein the polar solvent is selected from the group consisting essentially of water, acetone, dioxane, methyl butyl ketone and mixtures thereof.

18. A method of removing oxygenated impurities from fatty acid products containing such impurities, said fatty acid products obtained from a soap solution derived from a liquid phase oxidation of essentially linear hydrocarbons of an average molecular weight corresponding to hydrocarbons having 2 to 6 more carbon atoms than a desired range of fatty acids, consisting of mixing said fatty acid products with an equivalent amount of a mineral acid to effect a phase separation thereof into an organic and an inorganic layer, separating said organic layer from said inorganic layer, mixing said organic layer with a solution of sulfuric acid of a concentration less than 94% to form a two-layer system wherein the bottom layer contains a major proportion of said oxygenated impurities and the upper layer contains the desired range of fatty acids substantially free of said impurities, separating the two formed layers and subjecting said upper layer to the aforesaid mixing and separating steps thereby further reducing the amount of impurities in the desired range of fatty acids.

19. A method as defined in claim 18 wherein the solution of sulfuric acid includes a polar solvent which is substantially non-reactive with fatty acid carboxylic groups, the ratio of sulfuric acid to polar solvent ranging from 1:10 to 10:1.

20. A method as defined in claim 19 wherein the polar solvent is selected from the group consisting essentially of water, acetone, dioxane, methyl butyl ketone and mixtures thereof.

21. A method of producing relatively pure fatty acids from crude soap solutions of fatty acid products obtained from oxidation of essentially linear hydrocarbons of an average molecular weight corresponding to hydrocarbons having 2 to 6 more carbon atoms than a desired range of fatty acids, consisting essentially of feeding the crude soap solution into a pressure vessel, mixing said crude solution with a hydrogenation catalyst, purging air from said vessel, adding hydrogen gas at a pressure in the range of 350 to 650 p.s.i. to said vessel and substantially simultaneously raising the temperature within said pressure vessel to 190° C. to 300° C., maintaining said temperature and pressure conditions within the pressure vessel for a period of time ranging from 10 to 60 minutes, slowly releasing the pressure and allowing volatiles to escape so as to concentrate said soap solution, cooling said concentrated soap solution to below 70° C., removing the hydrogenation catalyst, adding one to three volume equivalents of a polar solvent selected from the group consisting of acetone, dioxane, methyl butyl ketone and mixtures thereof, acidifying the resulting system with a stoichiometric amount of sulfuric acid, allowing a precipitate of sodium sulfate to form and removing the same from said system while maintaining the temperature thereof in the range of 10° C. to 50° C., adding a relatively small additional amount of sulfuric acid to the system to effect a phase separation therein, and decanting a top layer therefrom, said top layer consisting essentially of the desired range of pure fatty acids.

22. A method of removing at least lactone impurities from fatty acid products containing such impurities, said fatty acid products obtained from a soap solution derived from a liquid phase oxidation of essentially linear hydrocarbons of an average molecular weight corresponding to hydrocarbons having 2 to 6 more carbon atoms than a desired range of fatty acids, consisting essentially of feeding said fatty acid products to a water solution containing at least an equivalent amount of bicarbonate to effect dissolution of the fatty acid products and form a soap solution thereof, allowing a two-layer system to form wherein an upper layer includes a majority of the lactone impurities and a lower layer includes a majority of the desired range of fatty acids, separating said layers and acidifying the lower layer with a stoichiometric amount of sulfuric acid to effect a phase separation therein, and separating a top layer therefrom, said top layer including essentially the desired range of fatty acids free from lactone impurities.

23. A method as defined in claim 22 wherein the removal of lactone impurities from the soap solution obtained by treatment of the fatty acid products with the aqueous bicarbonate solution is effected by extraction with a water insoluble organic solvent.

24. A method as defined in claim 22 wherein the fatty acid products containing lactone impurities is mixed with a water-soluble organic solvent capable of breaking emulsions prior to the addition of the aqueous bicarbonate solution.

25. A process for the manufacture of straight-chain monobasic fatty acids from essentially linear hydrocarbons of an average molecular weight corresponding to hydrocarbons having 2 to 6 more carbon atoms than a desired range of fatty acids, consisting of the step of;
substantially uniformly dispersing an organic peroxide catalyst having a half-life of 5 to 100 minutes at a temperature range of 120° to 180° C. with said linear hydrocarbons to obtain a mixture thereof;
heating said mixture to a temperature of not more than about 160° C.,
substantially simultaneously contacting said mixture with an oxygen-containing gas to effect an oxidation thereof not exceeding about 3% of free fatty acids by weight content of reactants;
adding and intermixing an alkaline solution with said reactants to effect saponification of said reactants and form a saponified mixture thereof;
collecting said saponified mixture to effect a phase separation thereof;
removing an upper phase of said saponified mixture and recycling said phase to said heating step;
adding a hydrogenation catalyst to a lower phase of said saponification mixture to form a reaction mixture;
purging air from around said reaction mixture;
adding pressurized hydrogen gas to said reaction mixture;
substantially simultaneously maintaining a temperature in the range of about 190° C. to 300° C. and a pressure in the range of about 500 to 2000 p.s.i. surrounding said reaction mixture for a period of time ranging from about 10 to 60 minutes;
gradually releasing the pressure and allowing volatiles to escape until a relatively concentrated soap solution is obtained;
removing the hydrogenation catalyst from the concentrated soap solution;
acidifying the relatively concentrated soap solution with an equivalent amount of a mineral acid; and
distilling the resultant product to obtain relatively pure fatty acids.

References Cited

UNITED STATES PATENTS

| 3,413,323 | 11/1968 | Berry | 260—413 |
| 2,969,380 | 1/1961 | Selwitz | 260—413 |
| 2,200,279 | 5/1940 | Kaufmann | 260—409 |
| 2,726,255 | 12/1955 | Walker et al. | 260—451 |

LEWIS GOTTS, Primary Examiner
E. G. LOVE, Assistant Examiner

U.S. Cl. X.R.
260—419, 533 R

UNITED STATES PATENT OFFICE
CERTIFICATE OF CORRECTION

Patent No. 3,708,513　　　　Dated January 2, 1973

Inventor(s) Joseph R. Wechsler

It is certified that error appears in the above-identified patent and that said Letters Patent are hereby corrected as shown below:

Column 4, lines 15-16, "oxy-yen" should read --oxygen--.

Column 6, line 36, cancel "oxidation reaction becomes self-sustained, and the crude".

Column 13, line 18, "removed" should read --recovered--.

Column 15, line 64, after "until" insert --complete --.

Column 16, line 15, "kieselguhr" should read --Kieselgur--.

Column 18, line 71, (claim 16, line 1) "claimed" should read --defined--.

Signed and sealed this 16th day of April 1974.

(SEAL)
Attest:

EDWARD M. FLETCHER, JR.
Attesting Officer

C. MARSHALL DANN
Commissioner of Patents